(12) United States Patent
Gorodetski et al.

(10) Patent No.: US 9,875,742 B2
(45) Date of Patent: Jan. 23, 2018

(54) WORD-LEVEL BLIND DIARIZATION OF RECORDED CALLS WITH ARBITRARY NUMBER OF SPEAKERS

(71) Applicant: Verint Systems Ltd., Herzliya Pituach (IL)

(72) Inventors: Alex Gorodetski, Rehovot (IL); Oana Sidi, Ramat Hasharon (IL); Ron Wein, Ramat Hasharon (IL); Ido Shapira, Tel Aviv (IL)

(73) Assignee: VERINT SYSTEMS LTD., Herzelia, Pituach (IL)

(*) Notice: Subject to any disclaimer, the term of this patent is extended or adjusted under 35 U.S.C. 154(b) by 0 days.

(21) Appl. No.: 15/006,572

(22) Filed: Jan. 26, 2016

(65) Prior Publication Data
US 2016/0217792 A1    Jul. 28, 2016

Related U.S. Application Data

(60) Provisional application No. 62/107,751, filed on Jan. 26, 2015, provisional application No. 62/107,702, filed on Jan. 26, 2015.

(51) Int. Cl.
| | | |
|---|---|---|
| *G10L 15/00* | (2013.01) | |
| *G10L 17/00* | (2013.01) | |
| *G10L 15/06* | (2013.01) | |
| *G10L 17/04* | (2013.01) | |
| *G10L 17/16* | (2013.01) | |

(Continued)

(52) U.S. Cl.
CPC .............. *G10L 17/04* (2013.01); *G10L 15/26* (2013.01); *G10L 17/02* (2013.01); *G10L 17/16* (2013.01); *G10L 25/84* (2013.01)

(58) Field of Classification Search
CPC .......... G10L 15/00; G10L 17/00; G10L 15/06
USPC ............. 704/240, 245, 246, 250; 348/14.12; 381/71.11
See application file for complete search history.

(56) References Cited

U.S. PATENT DOCUMENTS

| | | |
|---|---|---|
| 4,653,097 A | 3/1987 | Watanabe et al. |
| 4,864,566 A | 9/1989 | Chauveau |

(Continued)

FOREIGN PATENT DOCUMENTS

| | | |
|---|---|---|
| EP | 0598469 | 5/1994 |
| JP | 2004/193942 | 7/2004 |

(Continued)

OTHER PUBLICATIONS

Baum, L.E., et al., "A Maximization Technique Occurring in the Statistical Analysis of Probabilistic Functions of Markov Chains," The Annals of Mathematical Statistics, vol. 41, No. 1, 1970, pp. 164-171.

(Continued)

*Primary Examiner* — Seong-Ah A. Shin
(74) *Attorney, Agent, or Firm* — Meunier Carlin & Curfman

(57) ABSTRACT

Disclosed herein are methods of diarizing audio data using first-pass blind diarization and second-pass blind diarization that generate speaker statistical models, wherein the first pass-blind diarization is on a per-frame basis and the second pass-blind diarization is on a per-word basis, and methods of creating acoustic signatures for a common speaker based only on the statistical models of the speakers in each audio session.

16 Claims, 7 Drawing Sheets

(51) Int. Cl.
   *G10L 17/02* (2013.01)
   *G10L 25/84* (2013.01)
   *G10L 15/26* (2006.01)

(56) References Cited

U.S. PATENT DOCUMENTS

| | | | |
|---|---|---|---|
| 5,027,407 | A | 6/1991 | Tsunoda |
| 5,222,147 | A | 6/1993 | Koyama |
| 5,638,430 | A | 6/1997 | Hogan et al. |
| 5,805,674 | A | 9/1998 | Anderson |
| 5,907,602 | A | 5/1999 | Peel et al. |
| 5,946,654 | A | 8/1999 | Newman et al. |
| 5,963,908 | A | 10/1999 | Chadha |
| 5,999,525 | A | 12/1999 | Krishnaswamy et al. |
| 6,044,382 | A | 3/2000 | Martino |
| 6,145,083 | A | 11/2000 | Shaffer et al. |
| 6,266,640 | B1 | 7/2001 | Fromm |
| 6,275,806 | B1 | 8/2001 | Pertrushin |
| 6,427,137 | B2 | 7/2002 | Petrushin |
| 6,480,825 | B1 | 11/2002 | Sharma et al. |
| 6,510,415 | B1 | 1/2003 | Talmor et al. |
| 6,587,552 | B1 | 7/2003 | Zimmermann |
| 6,597,775 | B2 | 7/2003 | Lawyer et al. |
| 6,915,259 | B2 | 7/2005 | Rigazio |
| 7,006,605 | B1 | 2/2006 | Morganstein et al. |
| 7,039,951 | B1 | 5/2006 | Chaudhari et al. |
| 7,054,811 | B2 | 5/2006 | Barzilay |
| 7,106,843 | B1 | 9/2006 | Gainsboro et al. |
| 7,158,622 | B2 | 1/2007 | Lawyer et al. |
| 7,212,613 | B2 | 5/2007 | Kim et al. |
| 7,299,177 | B2 | 11/2007 | Broman et al. |
| 7,386,105 | B2 | 6/2008 | Wasserblat et al. |
| 7,403,922 | B1 | 7/2008 | Lewis et al. |
| 7,539,290 | B2 | 5/2009 | Ortel |
| 7,657,431 | B2 | 2/2010 | Hayakawa |
| 7,660,715 | B1 | 2/2010 | Thambiratnam |
| 7,668,769 | B2 | 2/2010 | Baker et al. |
| 7,693,965 | B2 | 4/2010 | Rhoads |
| 7,778,832 | B2 | 8/2010 | Broman et al. |
| 7,822,605 | B2 | 10/2010 | Zigel et al. |
| 7,908,645 | B2 | 3/2011 | Varghese et al. |
| 7,940,897 | B2 | 5/2011 | Khor et al. |
| 8,036,892 | B2 | 10/2011 | Broman et al. |
| 8,073,691 | B2 | 12/2011 | Rajakumar |
| 8,112,278 | B2 | 2/2012 | Burke |
| 8,145,562 | B2 | 3/2012 | Wasserblat |
| 8,311,826 | B2 | 11/2012 | Rajakumar |
| 8,510,215 | B2 | 8/2013 | Gutierrez |
| 8,537,978 | B2 | 9/2013 | Jaiswal et al. |
| 8,554,562 | B2 | 10/2013 | Aronowitz |
| 8,913,103 | B1 * | 12/2014 | Sargin ............... G06K 9/00221 348/14.12 |
| 9,001,976 | B2 | 4/2015 | Arrowood |
| 9,237,232 | B1 * | 1/2016 | Williams ............ H04M 3/4936 |
| 9,368,116 | B2 | 6/2016 | Ziv et al. |
| 9,558,749 | B1 * | 1/2017 | Secker-Walker ....... G10L 17/02 |
| 9,584,946 | B1 * | 2/2017 | Lyren ...................... H04S 7/30 |
| 2001/0026632 | A1 | 10/2001 | Tamai |
| 2002/0022474 | A1 | 2/2002 | Blom et al. |
| 2002/0099649 | A1 | 7/2002 | Lee et al. |
| 2003/0009333 | A1 | 1/2003 | Sharma et al. |
| 2003/0050780 | A1 | 3/2003 | Rigazio |
| 2003/0050816 | A1 | 3/2003 | Givens et al. |
| 2003/0097593 | A1 | 5/2003 | Sawa et al. |
| 2003/0147516 | A1 | 8/2003 | Lawyer et al. |
| 2003/0208684 | A1 | 11/2003 | Camacho et al. |
| 2004/0029087 | A1 | 2/2004 | White |
| 2004/0111305 | A1 | 6/2004 | Gavan et al. |
| 2004/0131160 | A1 | 7/2004 | Mardirossian |
| 2004/0143635 | A1 | 7/2004 | Galea |
| 2004/0167964 | A1 | 8/2004 | Rounthwaite et al. |
| 2004/0203575 | A1 | 10/2004 | Chin et al. |
| 2004/0225501 | A1 * | 11/2004 | Cutaia ................. G10L 13/033 704/260 |
| 2004/0240631 | A1 | 12/2004 | Broman et al. |
| 2005/0010411 | A1 | 1/2005 | Rigazio |
| 2005/0043014 | A1 | 2/2005 | Hodge |
| 2005/0076084 | A1 | 4/2005 | Loughmiller et al. |
| 2005/0125226 | A1 | 6/2005 | Magee |
| 2005/0125339 | A1 | 6/2005 | Tidwell et al. |
| 2005/0185779 | A1 | 8/2005 | Toms |
| 2006/0013372 | A1 | 1/2006 | Russell |
| 2006/0106605 | A1 | 5/2006 | Saunders et al. |
| 2006/0111904 | A1 * | 5/2006 | Wasserblat ............... G10L 17/00 704/246 |
| 2006/0149558 | A1 | 7/2006 | Kahn |
| 2006/0161435 | A1 | 7/2006 | Atef et al. |
| 2006/0212407 | A1 | 9/2006 | Lyon |
| 2006/0212925 | A1 | 9/2006 | Shull et al. |
| 2006/0248019 | A1 | 11/2006 | Rajakumar |
| 2006/0251226 | A1 | 11/2006 | Hogan et al. |
| 2006/0282660 | A1 | 12/2006 | Varghese et al. |
| 2006/0285665 | A1 | 12/2006 | Wasserblat et al. |
| 2006/0289622 | A1 | 12/2006 | Khor et al. |
| 2006/0293891 | A1 | 12/2006 | Pathuel |
| 2007/0041517 | A1 | 2/2007 | Clarke et al. |
| 2007/0071206 | A1 | 3/2007 | Gainsboro et al. |
| 2007/0074021 | A1 | 3/2007 | Smithies et al. |
| 2007/0100608 | A1 | 5/2007 | Gable et al. |
| 2007/0124246 | A1 | 5/2007 | Lawyer et al. |
| 2007/0244702 | A1 | 10/2007 | Kahn et al. |
| 2007/0280436 | A1 | 12/2007 | Rajakumar |
| 2007/0282605 | A1 | 12/2007 | Rajakumar |
| 2007/0288242 | A1 | 12/2007 | Spengler |
| 2008/0010066 | A1 | 1/2008 | Broman et al. |
| 2008/0181417 | A1 | 7/2008 | Pereg et al. |
| 2008/0195387 | A1 | 8/2008 | Zigel et al. |
| 2008/0222734 | A1 | 9/2008 | Redlich et al. |
| 2008/0240282 | A1 | 10/2008 | Lin |
| 2009/0046841 | A1 | 2/2009 | Hodge |
| 2009/0106846 | A1 | 4/2009 | Dupray |
| 2009/0119103 | A1 * | 5/2009 | Gerl ........................ G10L 17/04 704/243 |
| 2009/0119106 | A1 | 5/2009 | Rajakumar |
| 2009/0147939 | A1 | 6/2009 | Morganstein et al. |
| 2009/0247131 | A1 | 10/2009 | Champion et al. |
| 2009/0254971 | A1 | 10/2009 | Herz et al. |
| 2009/0319269 | A1 | 12/2009 | Aronowitz |
| 2010/0228656 | A1 | 9/2010 | Wasserblat et al. |
| 2010/0303211 | A1 | 12/2010 | Hartig |
| 2010/0305946 | A1 | 12/2010 | Gutierrez |
| 2010/0305960 | A1 | 12/2010 | Gutierrez |
| 2011/0004472 | A1 | 1/2011 | Zlokarnik |
| 2011/0026689 | A1 | 2/2011 | Metz et al. |
| 2011/0119060 | A1 * | 5/2011 | Aronowitz ............... G10L 17/02 704/250 |
| 2011/0161078 | A1 | 6/2011 | Droppo et al. |
| 2011/0191106 | A1 | 8/2011 | Khor et al. |
| 2011/0202340 | A1 * | 8/2011 | Ariyaeeinia ............ G10L 17/20 704/233 |
| 2011/0213615 | A1 | 9/2011 | Summerfield et al. |
| 2011/0251843 | A1 * | 10/2011 | Aronowitz ............... G10L 17/02 704/235 |
| 2011/0255676 | A1 | 10/2011 | Marchand et al. |
| 2011/0282661 | A1 * | 11/2011 | Dobry ..................... G10L 17/02 704/231 |
| 2011/0282778 | A1 | 11/2011 | Wright et al. |
| 2011/0320484 | A1 | 12/2011 | Smithies et al. |
| 2012/0053939 | A9 | 3/2012 | Gutierrez et al. |
| 2012/0054202 | A1 | 3/2012 | Rajakumar |
| 2012/0072453 | A1 | 3/2012 | Guerra et al. |
| 2012/0253805 | A1 | 10/2012 | Rajakumar et al. |
| 2012/0254243 | A1 | 10/2012 | Zeppenfeld et al. |
| 2012/0263285 | A1 | 10/2012 | Rajakumar et al. |
| 2012/0284026 | A1 | 11/2012 | Cardillo et al. |
| 2013/0163737 | A1 | 6/2013 | Dement et al. |
| 2013/0197912 | A1 | 8/2013 | Hayakawa et al. |
| 2013/0253919 | A1 | 9/2013 | Gutierrez et al. |
| 2013/0253930 | A1 * | 9/2013 | Seltzer ................. G10L 15/063 704/236 |
| 2013/0300939 | A1 | 11/2013 | Chou et al. |
| 2014/0067394 | A1 | 3/2014 | Abuzeina |

(56) References Cited

U.S. PATENT DOCUMENTS

| | | | |
|---|---|---|---|
| 2014/0074467 A1* | 3/2014 | Ziv | G10L 25/78 704/235 |
| 2014/0074471 A1 | 3/2014 | Sankar et al. | |
| 2014/0142940 A1 | 5/2014 | Ziv et al. | |
| 2014/0142944 A1 | 5/2014 | Ziv et al. | |
| 2015/0025887 A1* | 1/2015 | Sidi | G10L 17/02 704/245 |
| 2015/0055763 A1 | 2/2015 | Guerra et al. | |
| 2015/0249664 A1 | 9/2015 | Talhami et al. | |
| 2016/0217793 A1* | 7/2016 | Gorodetski | G10L 17/04 |
| 2017/0140761 A1* | 5/2017 | Secker-Walker | G10L 17/06 |

FOREIGN PATENT DOCUMENTS

| | | |
|---|---|---|
| JP | 2006/038955 | 9/2006 |
| WO | 00/77772 | 12/2000 |
| WO | 2004/079501 | 9/2004 |
| WO | 2006/013555 | 2/2006 |
| WO | 2007/001452 | 1/2007 |

OTHER PUBLICATIONS

Cheng, Y., "Mean Shift, Mode Seeking, and Clustering," IEEE Transactions on Pattern Analysis and Machine Intelligence, vol. 17, No. 8, 1995, pp. 790-799.

Cohen, I., "Noise Spectrum Estimation in Adverse Environment: Improved Minima Controlled Recursive Averaging," IEEE Transactions on Speech and Audio Processing, vol. 11, No. 5, 2003, pp. 466-475.

Cohen, I., et al., "Spectral Enhancement by Tracking Speech Presence Probability in Subbands," Proc. International Workshop in Hand-Free Speech Communication (HSC'01), 2001, pp. 95-98.

Coifman, R.R., et al., "Diffusion maps," Applied and Computational Harmonic Analysis, vol. 21, 2006, pp. 5-30.

Hayes, M.H., "Statistical Digital Signal Processing and Modeling," J. Wiley & Sons, Inc., New York, 1996, 200 pages.

Hermansky, H., "Perceptual linear predictive (PLP) analysis of speech," Journal of the Acoustical Society of America, vol. 87, No. 4, 1990, pp. 1738-1752.

Lailler, C., et al., "Semi-Supervised and Unsupervised Data Extraction Targeting Speakers: From Speaker Roles to Fame?," Proceedings of the First Workshop on Speech, Language and Audio in Multimedia (SLAM), Marseille, France, 2013, 6 pages.

Mermelstein, P., "Distance Measures for Speech Recognition—Psychological and Instrumental," Pattern Recognition and Artificial Intelligence, 1976, pp. 374-388.

Schmalenstroeer, J., et al., "Online Diarization of Streaming Audio-Visual Data for Smart Environments," IEEE Journal of Selected Topics in Signal Processing, vol. 4, No. 5, 2010, 12 pages.

Viterbi, A.J., "Error Bounds for Convolutional Codes and an Asymptotically Optimum Decoding Algorithm," IEEE Transactions on Information Theory, vol. 13, No. 2, 1967, pp. 260-269.

* cited by examiner

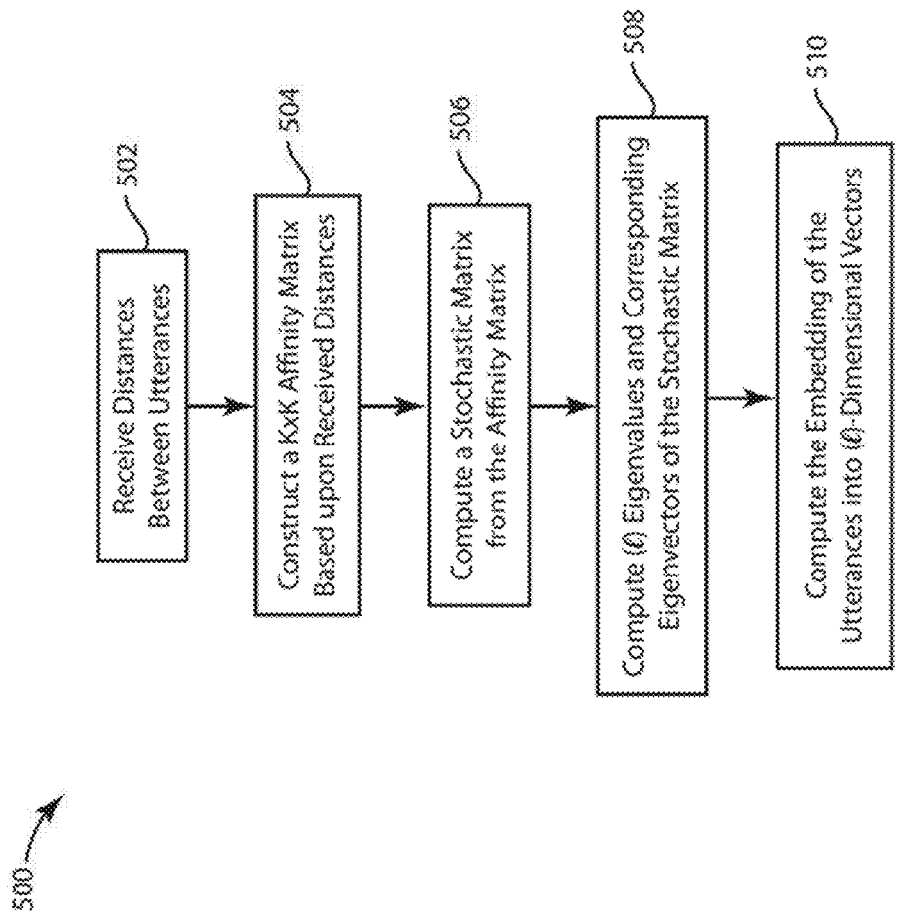

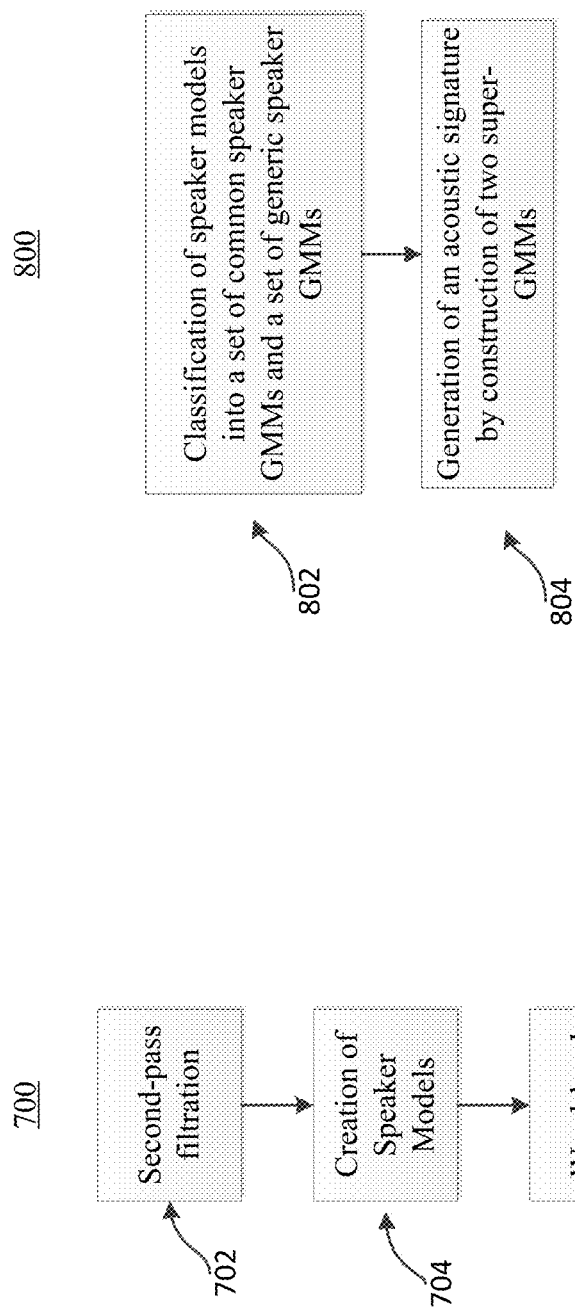

WORD-LEVEL BLIND DIARIZATION OF RECORDED CALLS WITH ARBITRARY NUMBER OF SPEAKERS

CROSS-REFERENCE TO RELATED APPLICATIONS

The present application claims priority of U.S. Provisional Patent Applications Nos. 62/107,702 and 62/107,751, both filed Jan. 26, 2015, the contents of which are each incorporated herein by reference in their entireties.

TECHNICAL FIELD

The present disclosure is related to the field of automated transcription. More specifically, the present disclosure is related to diarization of audio data with an arbitrary number of speakers and the creation of acoustic signatures for a speaker from multiple recorded sessions.

BACKGROUND

Speech transcription and speech analytics of audio data may be enhanced by a process of diarization wherein audio data that contains multiple speakers is separated into segments of audio data typically to a single speaker. While speaker separation in diarization facilitates later transcription and/or speech analytics, the identification of or discrimination between identified speakers can further facilitate these processes by enabling the association of context and information in later transcription and speech analytics processes specific to an identified speaker.

Previous diarization solutions for example of a recorded telephone conversation of a customer service application assume two speakers. The two speakers may exemplarily be a customer and an agent (i.e. a customer-service representative) in a call center. The two-speaker assumption greatly simplifies the blind-diarization task. However, many calls may have a more complex structure. Some calls may feature only a single speaker, exemplarily a recorded message or an IVR message. Other calls may contain additional "speech-like" segments. For example, these segments may include background talks. Still other examples of complex calls include calls with three speakers or more such as conference calls or calls in which one or more speakers are replaced by another speaker.

Prior blind diarization solutions have relied on a first-pass filtering which may fail to accurately filter out non-speech segments, e.g. noises or music, resulting in too many speakers being created. Additionally, prior blind diarization processes have relied on classification being performed solely on a per-frame basis and thus may fail to detect short utterances that are interleaved with longer utterances of another speaker.

Therefore, a blind-diarization algorithm that does not assume any prior knowledge on the number of speakers, that does not solely rely on per-frame classification, and performs robustly on calls with arbitrary number of speakers is achieved in embodiments as disclosed herein.

Building of acoustic signatures for a common speaker can be a problem. Given a set of recorded sessions (telephone calls, recordings from a meeting room, etc.). Namely, constructing a statistical model that can be used to detect the presence of that speaker in other recorded sessions. In a call-center environment, such a common speaker may be a customer service representative—for which typically there are hundreds of available sessions—or a customer making repeating calls to the call-center. In case of recorded material from meeting rooms, we may be interested in identifying a specific person participating in some of these meetings.

Given recorded audio from all sessions along with markers that indicate the presence of a common speaker within each session (start time and end time of each utterance of that speaker), the solution for creating an acoustic signature for a speaker can be quite straightforward. For example, it is possible to extract acoustic features from all relevant utterances and construct a statistical model that can be used as an acoustic label for the speaker. This can be done using simple classifiers a GMM, or more advanced techniques such as I-vectors.

However, storing and processing audio data from hundreds of recorded sessions may be very time consuming and pose a burden on the network if these sessions needs to be collected from several servers to a single location.

Therefore, a method that creates an acoustic signature for a common speaker based only on statistical models of the speakers in each session is further disclosed herein.

SUMMARY

An exemplary embodiment of a method of diarization of audio data includes identifying non-speech segments in the audio using a voice-activity-detector (VAD) and segmenting audio data into a plurality of utterance that are separated by the identified non-speech segments. Each utterance is represented as an utterance model representative of a plurality of feature vectors of each utterance. The utterance models are clustered. A plurality of speaker models are constructed from the clustered utterance models. A hidden Markov model (HMM) of the plurality of speaker models is constructed. A sequence of identified speaker models that best corresponds to the utterances of the audio data is decoded. Each VAD segment is decoded using a large-vocabulary continuous speech recognition (LVCSR) decoder, wherein the LVCSR decoder outputs words and non-speech symbols. The sequence of output words and non-speech symbols from the LVCSR decoder is analyzed, wherein non-speech parts are discarded and the segment is refined resulting in sub-segments comprising words. A second plurality of speaker models are constructed by feeding the resulting sub-segments into a clustering algorithm. A second HMM of the second plurality of speaker models is constructed. A best path corresponding to the sequence of output words in the second HMM is decoded by applying a Viterbi algorithm that performs word-level segmentation In an exemplary embodiment of a method of creating an acoustic signature for a speaker from multiple sessions, a training set containing a number of recorded audio sessions is obtained, wherein each session includes a plurality of speaker models, wherein each speaker model is characterized by its occupancy which is proportion to the number of feature vectors used to construct the speaker model, wherein the speaker models are Gaussian mixture models (GMMs). The plurality of speaker models are classified to identify a set of common speaker GMMs and a set of generic speaker GMMs, wherein the classifying includes constructing an undirected similarity graph having vertices corresponding to the plurality of speaker models of all the recorded audio session in the training set and classifying the plurality of speaker models according to a degree of their corresponding vertex in the undirected similarity graph. An acoustic signature is generated by at least: constructing a super-GMM for the set of common speaker GMMs, and constructing a super-GMM for the set of generic speaker GMMs by generating a large set of random vectors and training a GMM over these random vectors, wherein the acoustic signature for the common speak is given as the super-model pair of the two constructed super-GMMs.

The details of one or more embodiments of the disclosure are set forth in the accompanying drawings and the description below. Other features, objects, and advantages of the disclosure will be apparent from the description, drawings, and from the claims.

BRIEF DESCRIPTION OF THE DRAWINGS

FIG. 6 is a flow chart that depicts an exemplary embodiment of more detailed processes carried out during embodiments of a method of blind diarization with an arbitrary number of speakers FIG. 7 is a flow chart that depicts an exemplary embodiment of performing a second-pass blind diarization.

FIG. 8 is a flow chart that depicts an exemplary embodiment of a method of creating acoustic signatures for a speaker from multiple recorded audio sessions that is based only on statistical models of the speakers in each of a set of recorded sessions.

DETAILED DISCLOSURE

Speech transcription of audio data, which may include streaming or previously recorded audio data, is enhanced by diarization wherein a speaker identity is identified and associated with transcribed speech. A speaker diarization system and method is aimed at identifying the speakers in a given call and associating each transcribed speech segment with an identified speaker. Speaker diarization thus enables the separation of speakers in the transcription of audio data.

Embodiments of a diarization process disclosed herein include a first optional step of a speech-to-text transcription of audio data to be diarized. Next, a "blind" diarization of the audio data is performed. The audio data is exemplarily a .WAV file, but may also be other types of audio data in a pulse code modulated (PCM) format or linear pulse code modulated (LPCM) format. Furthermore, the audio data is exemplarily a mono audio file; however, it is recognized that embodiments of the systems and methods as disclosed herein may also be used with stereo audio data. The blind diarization receives the audio file and optionally the automatically generated transcript. This diarization is characterized as "blind" as the diarization is performed prior to an identification of the speakers. In an exemplary embodiment of a customer service call, the "blind diarization" may only cluster the audio data into speakers while it may still be undetermined which speaker is the agent and which speaker is the customer.

The blind diarization is followed by a speaker diarization wherein a voiceprint model that represents the speech and/or information content of an identified speaker in the audio data is compared to the identified speech segments associated with the separated speakers. Through this comparison, one speaker can be selected as the known speaker, while the other speaker is identified as the other speaker. In an exemplary embodiment of customer service interactions, the customer agent will have a voiceprint model as disclosed herein which is used to identify one of the separated speaker as the agent while the other speaker is the customer.

The identification of segments in an audio file, such as an audio stream or recording (e.g. a telephone call that contains speech) can facilitate increased accuracy in transcription, diarization, speaker adaption, and/or speech analytics of the audio file. An initial transcription, exemplarily from a fast speech-to-text engine, can be used to more accurately identify speech segments in an audio file, such as an audio stream or recording, resulting in more accurate diarization and/or speech adaptation.

Figure 1:
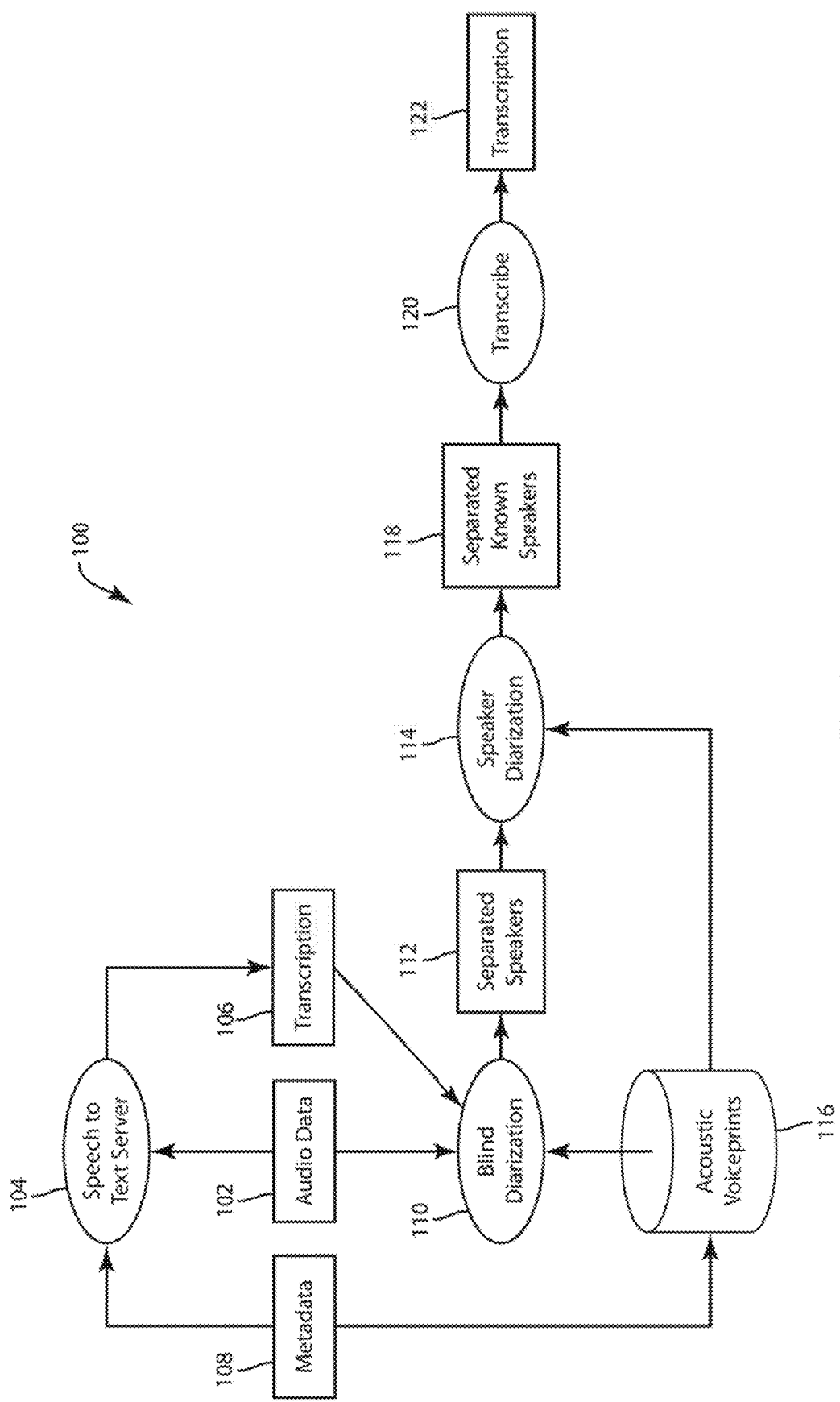
FIG. 1 is a flow chart that depicts an embodiment of a method of transcription using blind diarization.
Figure 2:
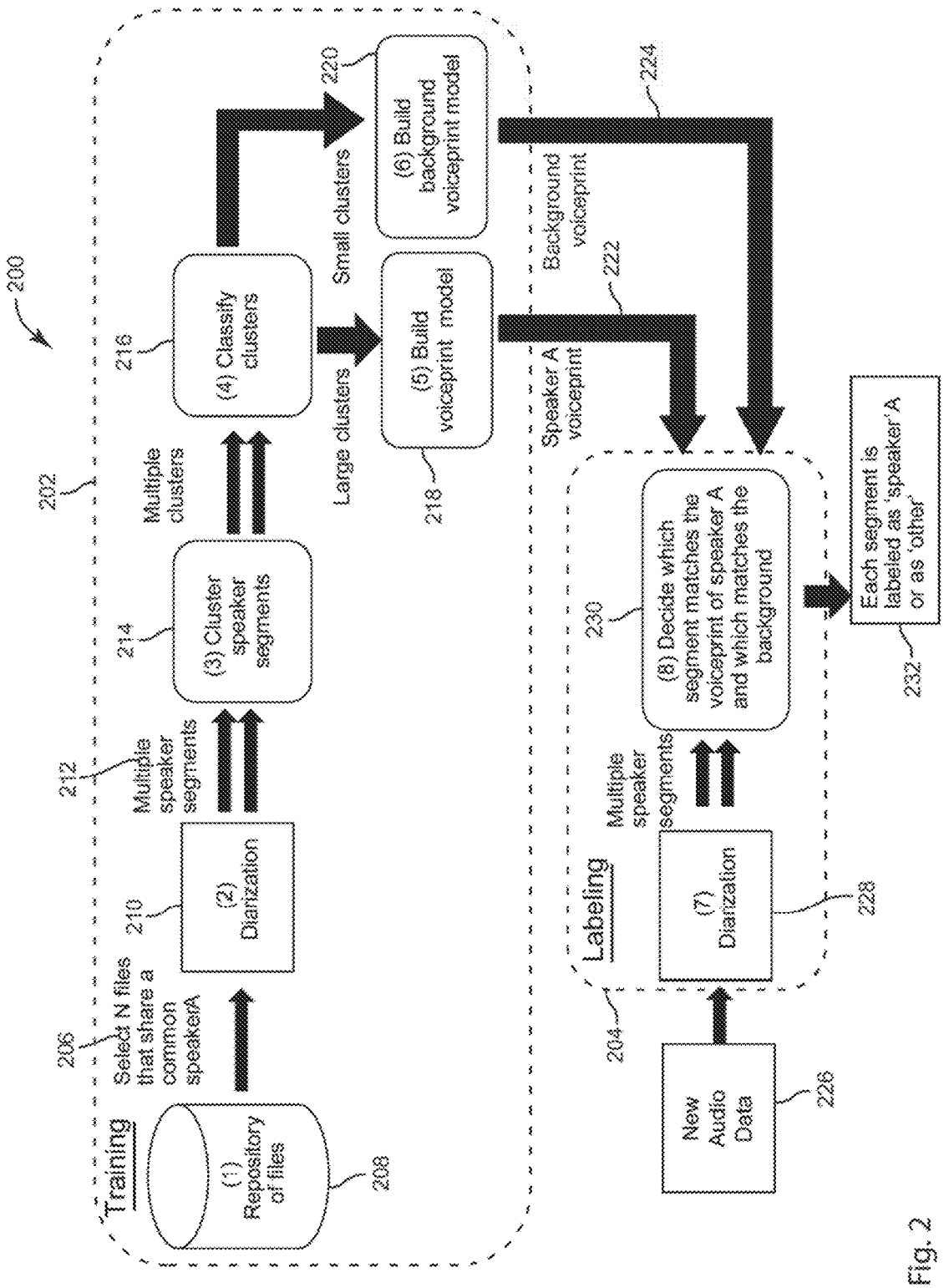
FIG. 2 is a flow chart that depicts an embodiment of creating and using an acoustic voiceprint model.
Figure 3:
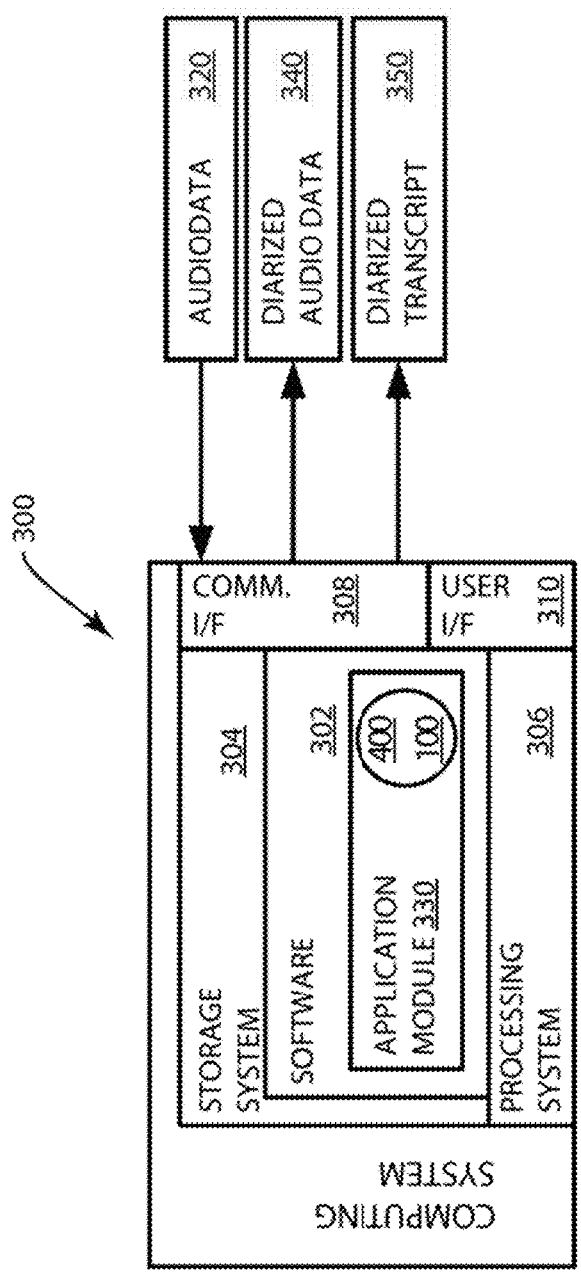
FIG. 3 is a system diagram of an exemplary embodiment of a system for diarization of audio data.
Figure 4:
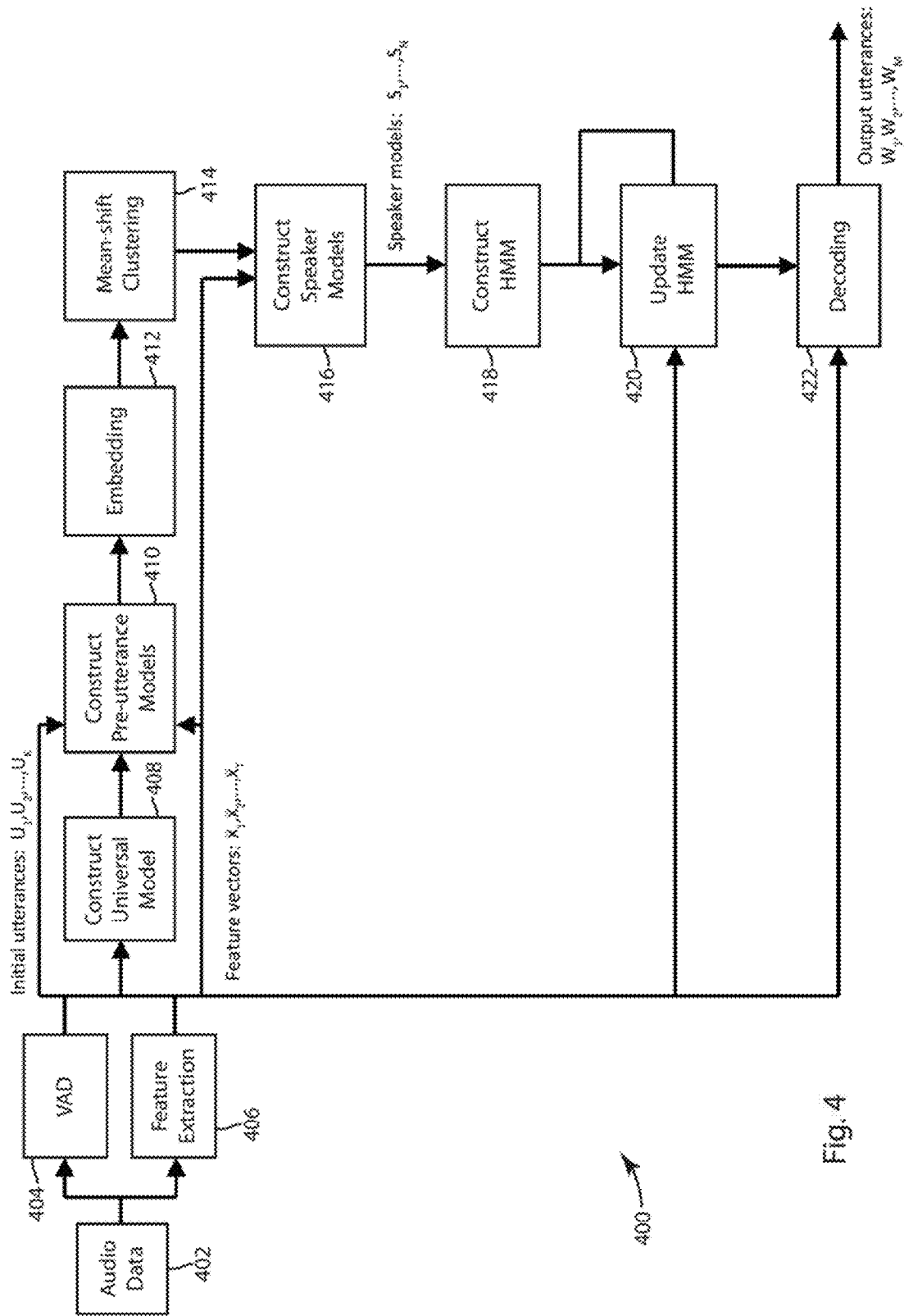
FIG. 4 is a flow chart that depicts an exemplary embodiment of a method of blind diarization with an arbitrary number of speakers.
Figure 5:
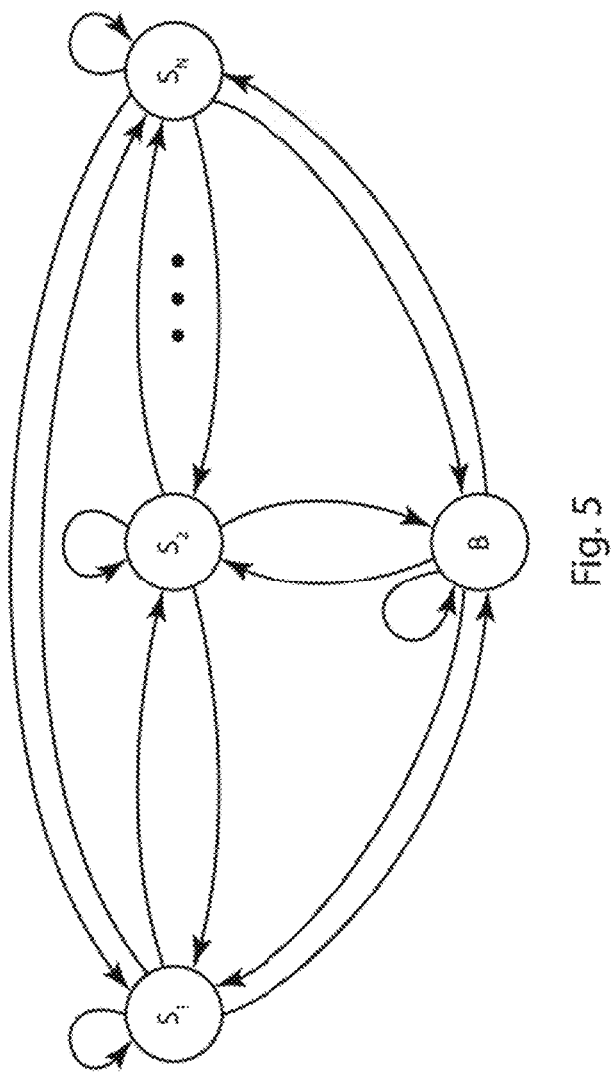
FIG. 5 depicts an exemplary embodiment of a state diagram modeling a conversation between N speakers.

FIGS. 1 and 2 are flow charts that respectively depict exemplary embodiments of method 100 of transcription using blind diarization and a method 200 of creating and using an acoustic voiceprint model. FIG. 4 depicts an exemplary embodiment of a method 400 of blind diarization with an arbitrary number of speakers. FIG. 5 depicts an exemplary embodiment of more detailed method 500 as may be incorporated into an embodiment of a method of blind diarization. FIG. 7 depicts an exemplary embodiment of a method 700 of performing second-pass blind diarization. FIG. 8 depicts an exemplary embodiment of a method 800 of creating acoustic signatures for a speaker from multiple recorded audio sessions that is based only on statistical models of the speakers in each of a set of recorded sessions. FIG. 3 is a system diagram of an exemplary embodiment of a system 300 which may carry out and implement any methods 100, 200, 400, 500, 700, and 800 as described in further detail herein. The system 300 is generally a computing system that includes a processing system 306, storage system 304, software 302, communication interface 308 and a user interface 310. The processing system 306 loads and executes software 302 from the storage system 304, including a software module 330. When executed by the computing system 300, software module 330 directs the processing system 306 to operate as described in herein in further detail in accordance with the methods 400, 500, 700, and 800 and in additional embodiments, methods 100 and 200.

Although the computing system 300 as depicted in FIG. 3 includes one software module in the present example, it should be understood that one or more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description.

The processing system 306 can comprise a microprocessor and other circuitry that retrieves and executes software 302 from storage system 304. Processing system 306 can be implemented within a single processing device but can also be distributed across multiple processing devices or subsystems that cooperate in executing program instructions. Examples of processing system 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such as a controller capable of communicating with the processing system 306.

Examples of storage media include random access memory, read only memory, magnetic discs, optical discs, flash memory, virtual memory and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 310 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 310.

As described in further detail herein, the computing system 300 receives and transmits data through the communication interface 308. In embodiments, the communication interface 308 operates to send and/or receive data to/from other devices to which the computing system 300 is communicatively connected. In the computing 300, audio data 320 is received at the communication interface 308. The audio data 320 may be an audio recording or a conversation, which may exemplarily be between an unknown number of speakers, although the audio recording may be any of a variety of other audio records, including two speakers, multiple speakers, a single speaker, or an automated or recorded auditory message. In still further embodiments, the audio data may be streaming audio data received in real time or near-real time by the computing system 300. In a further exemplary embodiment, the audio data may exemplarily be a .WAV file, but may also be other types of audio or video files, for example, pulse code modulated (PCM) formatted audio, and more specifically, linear pulse code modulated (LPCM) audio files. Furthermore, the audio data is exemplarily a mono audio file; however, it is recognized that embodiments of the method disclosed herein may also be used with stereo audio files. One feature of the methods disclosed herein are that speaker separation and diarization can be achieved in mono audio files where stereo speaker separation techniques are not available.

In still further embodiments, the audio data 320 is received at the computing system 300 at the communication interface 308. The processing system 306 further obtaining at least one acoustic model, which may be further received at the communication interface 308, or may be stored at the storage system 304. The processing system 306, upon execution of the application module 330 diarizes the audio data in the manner as described in further detail herein. In exemplary embodiments, the diarized audio data may be output from the communication interface 308 to another computing device. In other embodiments, the processing system 206 further operates to transcribe the diarized audio data in order to produce a diarized transcript 350. The diarized transcript 350 may be transmitted from the computing system 300 via the communication interface 308 to another computing device or may be exemplarily presented to a user at the user interface 310, which may exemplarily be a graphical display.

FIG. 1 is a flow chart that depicts an exemplary embodiment of a method 100 of diarization of audio data. The method 100 beings at the acquisition of audio data 102. As described above, the audio data acquired at 102 may exemplarily be real-time or streaming audio data of may be previously acquired and stored audio data.

In embodiments, the audio data 102 further comprises or is associated to metadata 108. The metadata 108 can exemplarily include an identification number for one or more of the speakers in the audio data 102. In alternative embodiments, the metadata 108 may provide information regarding context or content of the audio data 102, including a topic, time, date, location etc. In the context of a customer service call center, the metadata 108 provides a customer service agent identification.

In an embodiment, the audio data 102 and the metadata 108 are provided to a speech-to-text (STT) server 104, which may employ any of a variety of method of techniques for automatic speech recognition (ASR) to create an automated speech-to-text transcription 106 from the audio file. The transcription performed by the STT server at 104 can exemplarily be a large-vocabulary continuous speech recognition (LVCSR) and the audio data 102 provided to the STT server 104 can alternatively be a previously recorded audio file or can be streaming audio data obtained from an ongoing communication between two speakers. In an exemplary embodiment, the STT server 104 may use the received metadata 108 to select one or more models or techniques for producing the automated transcription cased upon the metadata 108. In a non-limiting example, an identification of one of the speakers in the audio data can be used to select a topical linguistic model based upon a content area associated with the speaker. In addition to the transcription 106 from the STT server 104, STT server 104 may also output time stamps associated with particular transcription segments, words, or phrases, and may also include a confidence score in the automated transcription. The transcription 106 may also identify homogeneous speaker speech segments. Homogenous speech segments are those segments of the transcription that have a high likelihood of originating from a single speaker. The speech segments may exemplarily be phonemes, words, or sentences.

After the transcription 106 is created, both the audio data 102 and the transcription 106 are used for a blind diarization at 110. However, it is to be recognized that in alternative embodiments, the blind diarization may be performed without the transcription 106 and may be applied directly to the audio data 102. In such embodiments, the features at 104 and 106 as described above may not be used. The diarization is characterized as blind as the identities of the speakers (e.g. agent, customer) are not known at this stage and therefore the diarization 110 merely discriminates between a first speaker (speaker 1) and a second speaker (speaker 2), or more. Additionally, in some embodiments, those segments for which a speaker cannot be reliably determined may be labeled as being of an unknown speaker.

An embodiment of the blind diarization at 110 receives the mono audio data 102 and the transcription 106 and begins with the assumption that there are two main speakers in the audio file. The blind diarization separates the audio data into frames as disclosed in further detail herein and separates the audio data into frames for diarization using two techniques. The first techniques uses energy envelopes in the audio file, or other audio analysis techniques as disclosed herein to identify segments attributable to separate speakers. The blind diarization process then filters out non-speech frames. In an exemplary embodiment, this may be performed by removing a frame if the dynamic energy range in the frame is below a predetermined threshold. Alternatively, or an addition, frames may be removed if the high frequency energy in the frame falls outside of a predetermined pass band for high frequency energy in a frame.

After the audio file has been segmented based upon the energy envelope analysis, homogeneous speaker segments from 106 are identified in the audio file. Then, long homogeneous speaker segments can be split into sub-segments if long silent intervals are found within a single segment. The sub-segments are selected to avoid splitting the long speaker segments within a word. The transcription information in the information file 106 can provide context to where individual words start and end. After the audio file has been segmented based upon both the audio file 102 and the information file 106, the identified segments are clustered into speakers (e.g. speaker 1, speaker 2, speaker N).

In an embodiment, the blind diarization uses voice activity detection (VAD) to segment the audio data 102 into utterances or short segments of audio data with a likelihood of emanating from a single speaker. In an embodiment, the VAD segments the audio data into utterances by identifying segments of speech separated by segments of non-speech on a frame-by-frame basis. Context provided by the transcription 106 can improve the distinction between speech and not speech segments. In the VAD, an audio frame may be identified as speech or non-speech based upon a plurality of characteristics or probabilities exemplarily based upon mean energy, band energy, peakiness, or residual energy; however, it will be recognized that alternative characteristics or probabilities may be used in alternative embodiments.

Embodiments of the blind diarization 110 may further leverage the received metadata 108 to select an acoustic voiceprint model 116, from a plurality of stored acoustic voiceprint models as well be described in further detail herein. Embodiments that use the acoustic voiceprint model in the blind diarization 110 can improve the clustering of the segmented audio data into speakers, for example by helping to cluster segments that are otherwise indeterminate, or "unknown."

The blind diarization at 110 results in audio data of separated speakers at 112. In an example, the homogeneous speaker segments in the audio data are tagged as being associated with a first speaker or a second speaker. As mentioned above, in some embodiments, in determinate segments may be tagged as "unknown" and audio data may have more than two speakers tagged.

At 114 a second diarization, "speaker" diarization, is undertaken to identify the tagged speakers. In a customer service context, this may include the identification of which speaker is the customer service agent.

A variety of techniques may be used to identify the agent, including acoustical matching techniques of speech transcription and text analysis techniques. In an embodiment, an agent model, which can be derived in a variety of manners or techniques, may be compared to the homogeneous speaker in the audio file segments assigned to speaker 1 and then compared to the homogeneous speaker segments in the audio file assigned to speaker 2 to determine which combination of homogenous speaker segments has a greater likelihood of matching the agent model. The homogeneous speaker segments tagged in the audio file as being the speaker that is most likely the agent based upon the comparison of the agent model are tagged as the agent and the homogeneous speaker segments tagged in the audio file as being the other speaker are tagged as the customer.

A transcript resulting from automatic speech-to-text transcription provides information on speech segments such as phonemes, words, or sentences. These speech segments can then be clustered into groups of speech segments that have a high likelihood of emanating from the same speaker. These clustered segments can be used to discriminate between speakers in the diarization process. The identification and use of identifiable speech segments as the input for the diarization can further facilitate filtering out noise and other non-speech segments that can interfere with the diarization process. In another embodiment, features or characteristics of the audio files of clustered as each of the speakers are compared to speech models of known agents, customers, or other speakers. From this comparison, one or both of the speakers may be identified.

In a still further exemplary embodiment of a customer service interaction, the metadata 108 identifies a customer service agent participating in the recorded conversation and the other speaker is identified as the customer. An acoustic voiceprint model 116, which can be derived in a variety of manners or techniques as described in more detail herein, is compared to the homogeneous speaker audio data segments assigned to the first speaker and then compared to the homogeneous speaker audio data segments assigned to the second speaker to determine which separated speaker audio data segments have a greater likelihood of matching the acoustic voiceprint model 116. At 118, the homogeneous speaker segments tagged in the audio file as being the speaker that is most likely the agent based upon the comparison of the acoustic voiceprint model 116 are tagged as the speaker identified in the metadata and the other homogeneous speaker segments are tagged as being the other speaker.

At 120, the diarized and labeled audio data from 118 again undergoes an automated transcription, exemplarily performed by a STT server or other form of ASR, which exemplarily may be LVCSR. With the additional context of both enhanced identification of speaker segments and clustering and labeling of the speaker in the audio data, an automated transcription 122 can be output from the transcription at 120 through the application of improved algorithms and selection of further linguistic or acoustic models tailored to either the identified agent or the customer, or another aspect of the customer service interaction as identified through the identification of one or more of the speakers in the audio data. This improved labeling of the speaker in the audio data and the resulting transcription 122 can also facilitate analytics of the spoken content of the audio data by providing additional context regarding the speaker, as well as improved transcription of the audio data.

It is to be noted that in some embodiments, the acoustic voice prints as described herein may be used in conjunction with one or more linguistic models, exemplarily the linguistic models as disclosed and applied in U.S. patent application Ser. No. 14/084,976, which is incorporated herein by reference. In such combined embodiments, the speaker diarization may be performed in parallel with both a linguistic model and an acoustic voice print model and the two resulting speaker diarization are combined or analyzed in combination in order to provide an improved separation of the audio data into known speakers. In an exemplary embodiment, if both models agree on a speaker label, then that label is used, while if the analysis disagrees, then an evaluation may be made to determine which model is the more reliable or more likely model based upon the context of the audio data. Such an exemplary embodiment may offer the advantages of both acoustic and linguistic modeling and speaker separation techniques.

In a still further embodiment, the combination of both an acoustic voiceprint model and a linguistic model can help to identify errors in the blind diarization or the speaker separation phases, exemplarily by highlighting the portions of the audio data above within which the two models disagree and providing for more detailed analysis on those areas in which the models are in disagreement in order to arrive at the correct diarization and speaker labeling. Similarly, the use of an additional linguistic model may provide a backup for an instance wherein an acoustic voiceprint is not available or identified based upon the received metadata. For example, this situation may arrive when there is insufficient audio data regarding a speaker to create an acoustic voiceprint as described in further detail herein.

Alternatively, in embodiments, even if the metadata does not identify a speaker, if an acoustic voiceprint exists for a speaker in the audio data, all of the available acoustic voiceprints may be compared to the audio data in order to identify at least one of the speakers in the audio data. In a still further embodiment, a combined implantation using a linguistic model and an acoustic model may help to identify an incongruity between the received metadata, which may identify one speaker, while the comparison to that speaker's acoustic voiceprint model reveals that the identified speaker is not in the audio data. In one non-limiting example, in the context of a customer service interaction, this may help to detect an instance wherein a customer service agent enters the wrong agent ID number so that corrective action may be taken. Finally, in still further embodiments the use of a combination of acoustic and linguistic models may help in the identification and separation of speakers in audio data that contain more than two speakers, exemplarily, one customer service agent and two customers; two agents and one customer; or an agent, a customer, and an automated recording such as a voicemail message.

FIG. 2 is a flow chart that depicts an embodiment of the creation and use of an acoustic voiceprint model exemplarily used as the acoustic voiceprint model 116 in FIG. 1. Referring back to FIG. 2, the method 200 is divided into two portions, exemplarily, the creation of the acoustic voiceprint model at 202 and the application or use of the acoustic voiceprint model at 204 to label speakers in an audio file. In an exemplary embodiment of a customer service interaction, the acoustic voiceprint model is of a customer service agent and associated with an agent identification number specific to the customer service agent.

Referring specifically to the features at 202, at 206 a number (N) of files are selected from a repository of files 208. The files selected at 206 all share a common speaker, exemplarily, the customer service agent for which the model is being created. In an embodiment, in order to make this selection, each of the audio files in the repository 208 are stored with or associated to an agent identification number. In exemplary embodiments, N may be 5 files, 100 files, or 1,000; however, these are merely exemplary numbers. In an embodiment, the N files selected at 20 may be further filtered in order to only select audio files in which the speaker, and thus the identified speaker are easy to differentiate, for example due to the frequency of the voices of the different speakers. By selecting only those files in which the acoustic differences between the speakers are maximized, the acoustic voiceprint model as disclosed herein may be started with files that are likely to be accurate in the speaker separation. In one embodiment, the top 50% of the selected files are used to create the acoustic voiceprint, while in other embodiments, the top 20% or top 10% are used; however, these percentages are in no way intended to be limiting on the thresholds that may be used in embodiments in accordance with the present disclosure.

In a still further embodiment, a diarization or transcription of the audio file is received and scored and only the highest scoring audio files are used to create the acoustic voiceprint model. In an embodiment, the score may exemplarily be an automatedly calculated confidence score for the diarization or transcription. Such automated confidence may exemplarily, but not limited to, use an auto correction function.

Each of the files selected at 206 are processed through a diarization at 210. The diarization process may be such as is exemplarily disclosed above with respect to FIG. 1. In an embodiment, the diarization at 210 takes each of the selected audio files and separates the file into a plurality of segments of speech separated by non-speech. In an embodiment, the plurality of speech segments are further divided such that each segment has a high likelihood of containing speech sections from a single speaker. Similar to the blind diarization described above, the diarization at 210 can divide the audio file into segments labeled as a first speaker and a second speaker (or in some embodiments more speakers) at 212.

At 214 the previously identified speaker segments from the plurality of selected audio files are clustered into segments that are similar to one another. The clustering process can be done directly by matching segments based upon similarity to one another or by clustering the speaker segments based upon similarities to a group of segments. The clustered speaker segments are classified at 216. Embodiments of the system and method use one or more metrics to determine which clusters of speaker segments belong to the customer service agent and which speaker segment clusters belong to the customers with whom the customer service agent was speaking. In one non-limiting embodiment, the metric of cluster size may be used to identify the segment clusters associated with the customer service agent as larger clusters may belong to the customer service agent because the customer service agent is a party in each of the audio files selected for use in creating a model at 206. While it will be recognized that other features related to the agent's script, delivery, other factors related to the customer service calls themselves may be used as the classifying metric.

At 218 an acoustic voiceprint model for the identified speaker, exemplarily a customer service agent is built using the segments that have been classified as being from the identified speaker. At 220 a background voiceprint model that is representative of the audio produced from speakers who are not the identified speaker is built from those speech segments identified to not be the identified speaker, and thus may include the other speakers as well as background noise.

Therefore, in some embodiments, the acoustic voiceprint model, such as exemplarily used with respect to FIG. 1 described above, includes both an identified speaker voiceprint 222 that is representative of the speech of the identified speaker and a background voiceprint 224 that is representative of the other speaker with whom the identified speaker speaks, and any background noises to the audio data of the identified speaker.

It will be recognized that in embodiments, the creation of the acoustic voiceprint model 202 may be performed in embodiments to create an acoustic voiceprint model for each of a plurality of identified speakers that will be recorded and analyzed in the diarization method of FIG. 1. Exemplarily in these embodiments, the identified speakers may be a plurality of customer service agents. In some embodiments, each of the created acoustic voiceprint models are stored in a database of acoustic voiceprint models from which specific models are accessed as described above with respect to FIG. 1, exemplarily based upon an identification number in metadata associated with audio data.

In further embodiments, the processes at 202 may be performed at regular intervals using a predefined number of recently obtained audio data, or a stored set of exemplary audio files. Such exemplary audio files may be identified from situations in which the identified speaker is particularly easy to pick out in the audio, perhaps due to differences in the pitch or tone between the identified speaker's voice and the other speaker's voice, or due to a distinctive speech pattern or characteristic or prevalent accent by the other speaker. In still other embodiments, the acoustic voiceprint model is built on an ad hoc basis at the time of diarization of the audio. In such an example, the acoustic model creation process may simply select a predetermined number of the most recent audio recordings that include the identified speaker or may include all audio recordings within a predefined date that include the identified speaker. It will be also noted that once the audio file currently being processed has been diarized, that audio recording may be added to the repository of audio files 208 for training of future models of the speech of the identified speaker.

204 represents an embodiment of the use of the acoustic voiceprint model as created at 202 in performing a speaker diarization, such as represented at 114 in FIG. 1. Referring back to FIG. 2, at 226 new audio data is received. The new audio data received at 226 may be a stream of real-time audio data or may be recorded audio data being processed. Similar to that described above with respect to 110 and 112 in FIG. 1, the new audio data 226 undergoes diarization at 228 to separate the new audio data 226 into segments that can be confidently tagged as being the speech of a single speaker, exemplarily a first speaker and a second speaker. At 230 the selected acoustic voiceprint 222 which may include background voiceprint 224, is compared to the segments identified in the diarization at 228. In one embodiment, each of the identified segments is separately compared to both the acoustic voiceprint 222 and to the background voiceprint 224 and an aggregation of the similarities of the first speaker segments and the second speaker segments to each of the models is compared in order to determine which of the speakers in the diarized audio file is the identified speaker.

In some embodiments, the acoustic voiceprint model is created from a collection of audio files that are selected to provide a sufficient amount of audio data that can be confidently tagged to belong only to the agent, and these selected audio files are used to create the agent acoustic model. Some considerations that may go into such a selection may be identified files with good speaker separation and sufficient length to provide data to the model and confirm speaker separation. In some embodiments, the audio files are preprocessed to eliminate non-speech data from the audio file that may affect the background model. Such elimination of non-speech data can be performed by filtering or concatenation.

In an embodiment, the speakers in an audio file can be represented by a feature vector and the feature vectors can be aggregated into clusters. Such aggregation of the feature vectors may help to identify the customer service agent from the background speech as the feature vector associated with the agent will aggregate into clusters more quickly than those feature vectors representing a number of different customers. In a still further embodiment, an iterative process may be employed whereby a first acoustic voiceprint model is created using some of the techniques disclosed above, the acoustic voiceprint model is tested or verified, and if the model is not deemed to be broad enough or be based upon enough speaker segments, additional audio files and speaker segments can be selected from the repository and the model is recreated.

In one non-limiting example, the speaker in an audio file is represented by a feature vector. An initial super-segment labeling is performed using agglomerative clustering of feature vectors. The feature vectors from the agent will aggregate into clusters more quickly than the feature vectors from the second speaker as the second speaker in each of the audio files is likely to be a different person. A first acoustic voiceprint model is built from the feature vectors found in the largest clusters and the background model is built from all of the other feature vectors. In one embodiment, a diagonal Gaussian can be trained for each large cluster from the super-segments in that cluster. However, other embodiments may use Gaussian Mixture Model (GMM) while still further embodiments may include i-vectors. The Gaussians are then merged where a weighting value of each Gaussian is proportionate to the number of super-segments in the cluster represented by the Gaussian. The background model can be comprised of a single diagonal Gaussian trained on the values of the super segments that are remaining.

Next, the acoustic voiceprint model can be refined by calculating a log-likelihood of each audio file's super-segments with both the acoustic voiceprint and background models, reassigning the super-segments based upon this comparison. The acoustic voiceprint and background models can be rebuilt from the reassigned super-segments in the manner as described above and the models can be iteratively created in the manner described above until the acoustic voiceprint model can be verified.

The acoustic voiceprint model can be verified when a high enough quality match is found between enough of the sample agent super-segments and the agent model. Once the acoustic voiceprint model has been verified, then the final acoustic voiceprint model can be built with a single full Gaussian over the last super-segment assignments from the application of the acoustic voiceprint model to the selected audio files. As noted above, alternative embodiments may use Gaussian Mixture Model (GMM) while still further embodiments may use i-vectors. The background model can be created from the super-segments not assigned to the identified speaker. It will be recognized that in alternative embodiments, an institution, such as a call center, may use a single background model for all agents with the background model being updated in the manner described above at periodic intervals.

Embodiments of the method described above can be performed or implemented in a variety of ways. The SST server, in addition to performing the LVCSR, can also perform the diarization process. Another alternative is to use a centralized server to perform the diarization process. In one embodiment, a stand-alone SST server performs the diarization process locally without any connection to another server for central storage or processing. In an alternative embodiment, the STT server performs the diarization, but relies upon centrally stored or processed models, to perform the initial transcription. In a still further embodiment, a central dedicated diarization server may be used where the output of many STT servers are sent to the centralized diarization server for processing. The centralized diarization server may have locally stored models that build from processing of all of the diarization at a single server.

FIG. 4 is a flow chart that depicts an exemplary embodiment of a method 400 of performing a blind diarization. The method may exemplarily be carried out within the method 100 as described above, or in another application of blind diarization. The method 400 begins with audio data 402. The audio data 402 may be streaming audio captured and processed in real-time or near-real-rime, or in other embodiments may be a previously acquired and stored audio file. In an embodiment, the audio data is a mono audio file.

A voice-activity detector (VAD) is used at 404 to identify non-speech segments and the audio file is segmented into utterances that are separated by the identified non-speech segments. In an embodiment, the audio data is segmented into a series of overlapping frames exemplarily 20-25 milliseconds in length; however, this is not intended to be limiting on the scope of the disclosure. In an exemplary embodiment of a speech-processing system, a 20-25 millisecond frame is processed every 10 milliseconds. Such speech frames are long enough to perform meaningful spectral analysis and capture the temporal acoustic characteristics of the speech signal, yet they are short enough to give fine granularity of the output. In an embodiment, the VAD segments the audio data into utterances by identifying segments of the audio data that includes speech from segments of non-speech on a frame-by-frame basis. An audio frame may be identified as speech or non-speech based upon a plurality of characteristics or probabilities exemplarily based upon mean energy, band energy, peakiness, or residual energy; however, it will be recognized that alternative characteristics or probabilities may be used in alternative embodiments. To guarantee the robustness of the following steps, it is possible to ignore very short utterances. Therefore, the set of sufficiently long utterances is denoted as $U_1$, $U_2, \ldots, U_K$ (wherein K is the initial number of utterances). The kth utterance is defined by its start time and its end time $U_k = \langle s_k, e_k \rangle$.

Acoustic features are extracted at 406 for the entire conversation $\vec{x}_1, \vec{x}_2, \ldots, \vec{x}_T$ (wherein T is the total number of frames). The sequence of feature vectors corresponding to the kth utterance is therefore $\vec{x}_{s_k}, \ldots \vec{x}_{e_k}$. Having segmented the input signal into frames, the diarization problem becomes discrete and can be viewed as a Markov process, where the attribution of a frame to a certain speaker (or the classification of the frame as silence or background noise) depends only on the previous frame and the acoustic characteristics of the frame itself. The extraction of acoustic features at 406 provides this information for the diarization process.

While many types of acoustic features may be extracted, in an exemplary embodiment, the acoustic features are perceptive linear predictive analytics (PLP) as described in: Hermansky H. "Perceptual Linear Predictive (PLP) analysis of speech" in Journal of the Acoustical Society of America, 87(2), pages 1738-1752. B, which is incorporated by reference in its entirety. In an exemplary embodiment as will be described in further detail herein, the extracted acoustic features are Mel-frequency cepstral coefficients (MFCC) for each frame. The MFCC's are used to model acoustic characteristics of the different speakers. The computation of MFCC is exemplary described in further detail in (Mermelstein P. "Distance measures for speech recognition, psychological and instrumental," in *Pattern Recognition and Artificial Intelligence*, Chen C. H. (Editor), pages 374-388; Academic, New York (1976)) which is hereby incorporated by reference in its entirety. Different speakers are then characterized by different multi-dimensional distributions of their MFCC features, exemplarily in a manner as described below.

The MFCC features extracted from each frame are given as a vector of real values of some fixed dimension d. Since the distribution of the feature vectors may be very complex, it is more convenient to approximate it as a combination of simpler distributions. The Gaussian mixture model (GMM) is a commonly used representation for a d-dimensional distribution.

A multivariate normal distribution (a.k.a. Gaussian distribution) of a vector of d random variables, $\vec{x} = (x_1, \ldots, x_d)$, is characterized by the probability density function:

$$f(\vec{x}) = \frac{1}{\sqrt{(2\pi)^d \cdot \det(\Sigma)}} \cdot \exp\left(-\frac{1}{2} \cdot (\vec{x} - \vec{\mu})^T \cdot \Sigma^{-1} \cdot (\vec{x} - \vec{\mu})\right)$$

Where $\vec{u} = (E(x_1), \ldots, E(x_d))$ is the expectancy vector and $\Sigma = (\text{cov}(x_i, x_j))_{i,j}$ is the covariance matrix. One can obtain the likelihood of a given random vector with respect to a Gaussian distribution by taking the natural logarithm of the probability density function:

$$L(\vec{x}) = \ln(f(\vec{x})) = -\frac{1}{2} \cdot \left(\ln((2\pi)^d \cdot \det(\Sigma)) + (\vec{x} - \vec{\mu})^T \cdot \Sigma^{-1} \cdot (\vec{x} - \vec{\mu})\right)$$

In case the random variables are independent (as usually is the case for cepstral coefficients), the covariance matrix becomes diagonal, so the density function can be simplified by using the variance vector $\vec{\sigma}^2 = \text{var}(x_1), \ldots, \text{var}(x_d)$:

$$L(\vec{x}) = -\frac{1}{2} \cdot \left(\ln\left((2\pi)^d \cdot \prod_{i=1}^{d} \sigma_i^2\right) + \sum_{i=1}^{d} \frac{(x_i - \mu_i)^2}{\sigma_i^2}\right)$$

A GMM comprises a set of n Gaussians and their probabilities $p_1, \ldots, p_n$ (with $\Sigma_{k=1}^{K} p_n = 1$). The likelihood of a random vector with respect to such a GMM is given by (we denote by $a \oplus b$ the operation off addition in the log domain $\ln(e^a + e^b)$):

$$G(\vec{x}) = [\ln(p_1) + L_1(\vec{x})] \oplus [\ln(p_2) + L_2(\vec{x})] \oplus \ldots \oplus [\ln(p_n) + L_n(\vec{x})]$$

In order to represent the initial utterances $U_1, U_2, \ldots, U_K$, which are not real-valued vectors, and there is no natural distance metric defined on them, using real-valued vectors of a smaller dimension, an approach based on diffusion map embedding has been developed. Diffusion map embedding is generally described by (Coifman R. R., Lafon S. "Diffusion maps". *Applied and Computational Harmonic Analysis* 21: 5-30 (2006)), which is herein incorporated by reference in its entirety.

A large set of n Gaussians representing these feature vectors of the entire audio data is constructed at 408. A possible way to construct such a set is to use the k-means algorithm on the set of feature vectors. We refer to this set of Gaussians as the universal model.

Next, at 410 for each utterance ($U_k$)) an utterance model is constructed that represents the distribution of the feature vectors in that utterance. In an exemplary embodiment, the utterance model is a GMM ($G_k$) Each GMM is based on the n Gaussians of the universal model constructed in the previous step, with its mixture probabilities computed using the following formula (for each $1 \leq i \leq n$):

$$p_i^{(k)} = \frac{1}{e_k - s_k + 1} \cdot \sum_{t=s_k}^{e_k} \exp(L_i(\vec{x}_t) - [L_1(\vec{x}_t) \oplus \ldots \oplus L_n(\vec{x}_t)])$$

Once each utterance is characterized by the vector of mixture probabilities of its GMM, a distance metric between the utterances is defined. This distance can be used to identify between speakers. Conceptually, each speaker has a unique combination of acoustic features reflected in the GMM and the distance metrics between the GMMs highlight these differences. In an embodiment, the distance metric between a pair of utterances (e.g. $U_j$ and $U_k$) is the Euclidean distance between the probabilities vector of the utterances ($U_j$ and $U_k$) respective GMMs $G_j$ and $G_k$:

$$\delta(U_j, U_k) = \sqrt{\sum_{i=1}^{n} \left(p_i^{(j)} - p_i^{(k)}\right)^2}$$

Next, at 412, a process of embedding is performed in order to aid in the identification and separation of speakers by creating additional mathematical separation between the GMMs of utterances that are less similar. By mathematically separating dissimilar GMMs, the computed Euclidean distance will be greater, drawing sharper contrast between figure clusters. A more detailed embodiment of a process of embedding is described herein in further detail with respect to FIG. 6.

At 414 clustering is used to identify those utterances having similar acoustic features. In one exemplary embodiment, the clustering at 414 is mean-shift clustering, although it is recognized that any clustering method that does not assume a priori knowledge of the number of clusters may be used, including, but not limited to hierarchical clustering. An exemplary embodiment of mean-shift clustering is disclosed by (Cheng Y. "Mean shift, mode seeking, and clustering". *IEEE Transactions on Pattern Analysis and Machine Intelligence* 17(8): 790-799 (1995)), which is herein incorporated by reference in its entirety. In an embodiment, the mean-shift clustering algorithm automatically finds the most suitable number of clusters for its input data set. The mean-shift algorithm accepts a set of real-valued vectors of dimension l, denoted $\vec{y}_1, \vec{y}_2, \ldots, \vec{y}_K \in \Re^l$, and computes a subdivision into N clusters based on the Euclidean distance between pairs of data vectors, where N is not known in advance. In an embodiment, input data vectors $\vec{y}_1, \vec{y}_2, \ldots, \vec{y}_K$ represent the initial utterances $U_1, U_2, \ldots, U_K$ and N is the number of speakers in the recorded conversation. The subdivision computed by the mean-shift algorithm defines the initial association of utterances to each of these N speakers. Each of the identified N clusters can be used as a model of each speaker constructed at 416.

Having partitioned the initial utterances into clusters, by maximizing the differences between their acoustic features and mean-shift clustering to form speaker models at 416 a hidden Markov model (HMM) of the clustered speakers is created at 418. FIG. 5 is an exemplary embodiment of a state diagram modeling a conversation between N speakers in the form of a HMM. The MEW includes states labeled $S_1$, $S_2 \ldots S_N$ represent the speakers, and are each associated with cluster of utterances obtained as described above. The HMM state labeled B represents the background and non-speech portions of the conversation. It is possible to associate the background and non-speech portions with a GMM that is computed using the feature vectors extracted from the audio portions that are classified as non-speech as described above.

As continuous speech and non-speech segments are expected, the probabilities associated with the self-loops of the HMM should be very high. Since each utterance is exemplarily 20 milliseconds long, a significant number of utterances associated with the same state ($S_1, S_2, S_N, B$) will likely occur in a row before a transition is made to another speaking state. In an exemplary embodiment each self-loop is given an initial probability p that is close to one. The probabilities of the other arcs, which represent transitions between states, in an embodiment may initially equal $$\frac{1}{N}(1-p).$$

The initial HMM parameters are updated at 420, exemplarily through the use of Baum-Welch re-estimation. This update may exemplary be performed using the complete sequence of feature vectors $x_1, x_2, \ldots, x_T$. In a non-limiting embodiment, this updating can be performed with one or more iterations of the Baum-Welch algorithm as described in (Baum L. E, Petrie T., Soules G., Weiss N., "A maximization technique occurring in the statistical analysis of probabilistic functions of Markov chains". *The Annals of Mathematical Statistics* 41(1), 164-171 (1970)), which is hereby incorporated by reference in its entirety.

The best path corresponding to $x_1, x_2, \ldots, x_T$ in the resulting HMM is decoded at 422. In an non-limiting embodiment this may be performed using the Viterbi algorithm as described in Viterbi A. J., "Error bounds for convolutional codes and an asymptotically optimum decoding algorithm". *IEEE Transactions on Information Theory* 13(2): 260-269 (1967), which is hereby incorporated by reference in its entirety. The Viterbi algorithm outputs a best path as a sequence of the speaker states ($S_1, S_2, S_N, B$) and time lengths at these states that best corresponds to the underlying signal. The identified best path is analyzed to locate sufficiently long sequences of traversals of either $S_1$ or $S_2$, and to create output utterances $W_1, W_2, \ldots, W_M$. An output utterance $W_m = \langle s_m, e_m, l_m \rangle$ is also given a label $l_m \in \{S_1, \ldots S_N\}$ that corresponds to the best-path sub-sequence that has induced it.

In other words, the Viterbi algorithm is performed on a per-frame basis; namely, given a feature sequence $\vec{x}_1, \ldots \vec{x}_T$ that represents the feature vectors of a single utterance, define $M[k,t]$ as the maximal score of reaching the k'th state after the first t feature vectors $\vec{x}_1, \ldots, \vec{x}_t$. Thus for each k, let: $M[k,0]=0$ and for each $1 \leq t \leq T$, let:

$$M[k, t] = \max_{1 \le j \le m} \{M[j, t-1] + \omega(j, k) + S_k(\vec{x}_t)\},$$

in which $S_k(\vec{x}_t)$ is the emission log-likelihood of the feature vector $\vec{x}_t$ from the GMM $S_k$, and $\omega(j,k)$ is the logarithmic weight of the transition from $S_j$ to $S_k$. Then locate the overall maximal score for the entire sequence, namely find $$\max_k M[k, T]$$

and trace back the best path, which indices the segmentation, via back-pointers.

FIG. 6 is a flow chart that depicts an exemplary embodiment of a more detailed process carried out during embodiments of a method of blind diarization with an arbitrary number of speakers, particularly, the method 500 depicted in FIG. 6 depicts an exemplary embodiment of steps that may be carried out in forming the embedding at 412 of the method 400 as found in FIG. 4. The method 500 begins by receiving calculated distances between the utterances 502. In an embodiment, the distances are Euclidean distances between the probability vectors of the utterances of the N Gaussians of the universal model.

At 504, a K×K affinity matrix D is constructed based upon the distance metric given by the following equation in which σ is a parameter:

$$D_{jk} = \exp\left(-\frac{\delta^2(U_j, U_k)}{\sigma}\right)$$

Next, at 506, a stochastic matrix W is computed form the K×K affinity matrix D. the stochastic matrix W can be computer using the following equation:

$$W_{jk} = \frac{D_{jk}}{\sum_{i=1}^{K} D_{ji}}$$

Since W is a stochastic matrix, the largest eigenvalue of the matrix equals 1. At 508, the next l largest eigenvalues of the matrix W, denoted $\lambda_1, \ldots, \lambda_l$, and their corresponding eigenvectors $\vec{v}_1, \ldots, \vec{v}_l$ are computed from the stochastic matrix W.

Finally, at 510 the embedding of the utterances $U_1, U_2, \ldots, U_K$ into l-dimensional vectors $(\vec{y}_1, \vec{y}_2, \ldots, \vec{y}_K \in \Re^l)$ is computed. The l-dimensional vectors $(\vec{y}_1, \vec{y}_2, \ldots, \vec{y}_K \in \Re^l)$, of which α is a parameter, are defined as follows:

$$\vec{y}_{k,i} = (\lambda_i)^\alpha \cdot \vec{v}_{k,i}$$

The embedded utterances can then be processed using mean-shift clustering as described above with respect to FIG. 4.

The method as described above is thus capable of recognizing an arbitrary number of speakers in a conversation. This produces a number of distinct advantages. The accuracy of the blind diarization is significantly higher, as the algorithm is not forced to separate the conversation between two speakers. Problematic utterances, such as, but not limited to, background talks or cross-talks, tend to be clustered as a separate speaker (or sometimes several speakers). When transcribed, these segments tend to have low transcription score. Therefore, it is possible to disqualify such low-quality clusters that do not represent true speakers. In embodiments wherein the conversation needs to be fully transcribed, and not just diarized, it is possible to benefit from the accurate diarization and use per-speaker model adaptation, which increases the accuracy of transcription as well.

The diarization results may be used to identify a specific speaker, some of the speakers or all speaker, in embodiments wherein the voice characteristics of these speakers (e.g. their voice characteristics) are known to the system. In embodiments, it is possible to detect an irregular event in the conversation. Such irregular events may include, but are intended to by merely exemplary, call transfers, speaker switches, or joining of an additional speaker to a conference call. In embodiments, diarization results can be further used to derive more accurate statistics out of each conversation such as numbers of speakers, speaker total duration, or a speaker histogram. Certain anomalies can be detected using these statistics, such allowing more accurate analysis of the conversation by an expert system. As non-limiting examples, calls with a single speaker may be discarded or calls with unusual behaviors may be excluded. In embodiments, the diarization process also determines the speakers' change points during a conversation. Such information is highly valuable in analyzing the conversation flow.

However, the blind diarization process described above is not without potential drawbacks. For example, in some known cases VAD filtering has been seen to fail to filter out non-speech segments, noises or music—so as a result too many speakers are created by the blind-diarization algorithm. In such a case, the segments of one of the speakers may be wrongly split between two false speakers. In other cases, two true speakers may be misclassified as a single speaker while the other speaker comprises mainly non-speech segments.

Another potential drawback of the blind diarization process is that because the Viterbi process is performed on a per-frame basis, the value of $\omega(j,k)$ for $j=k$ must be significantly higher than the values for $j \ne k$ in order to avoid very frequent transitions among speakers. Thus the blind diarization process sometimes fails to detect short utterances if the short utterances are interleaved with longer utterances of another speaker due to these ω values.

To address the drawbacks above, a second-pass blind diarization process, which can be added to the blind diarization process described above, is disclosed herein. In general, The because VOD filtering in certain cases is not accurate enough, one can use the results of a second-pass LVCSR decoder, which are significantly more accurate, to obtain much more reliable filtering of non-speech segments as compared to only using VOD filtering. The number of speakers and the speaker GMMs can then be constructed based on the more accurate speech segments. However, as the second-pass decoding is a time-consuming process, in certain embodiments second-pass decoding is not repeated after the speakers are identified. Instead, the decoded words are assigned to the speakers in a process called word-level segmentation.

FIG. 7 is a flow chart that depicts an exemplary embodiment of a method 700 of performing second-pass blind diarization. The method 700 may exemplary be carried out within the method 400, for example after step 422, or in other suitable applications like blind diarization. The method 700 begins with a second-pass filtration process that uses the results of a second-pass LVCSR decoder to filter non-speech segments from the initial segments classified by the VAD detector as containing speech 702.

In an exemplary embodiment, the second-pass filtering process 702 beings with each VAD segment being decoded using for example an LVCSR decoder. The sequence of output words and non-speech symbols from the LVCSR decoder is then analyzed, the non-speech parts are discarded and the segment is refined accordingly. Thus for example, if the LVCSR decoder output on a certain segment was "<SIL> GOOD MORNING <SIL> <VN> <SIL> YES YES I COULD NOT GET ANY INFORMATION THERE", then the segment is split into two, the first sub-segment corresponding to the word sequence "GOOD MORNING", and the other sub-segment corresponds to "YES YES I COULD NOT GET ANY INFORMATION THERE". Segments that mainly contain non-speech symbols may be completed discarded.

The second-pass blind diarization 700 method then creates speaker models by feeding the resulting sub-segments into a clustering algorithm 704, for example, feeding the resulting sub-segments into the mean-shift algorithm described in detail above. The output of the clustering algorithm are speaker models, for example, GMMs that are based only on the "clean" speech segments, which can be denoted as $\hat{S}_1, \ldots, \hat{S}_{m'}$ (m' is the number of speakers, as determined by the second invocation of the mean-shift algorithm).

The second-pass blind diarization 700 method then performs word-level segmentation 706 which uses the speaker models, for example, GMMs $\hat{S}_1, \ldots, \hat{S}_{m'}$ to construct an HMM. The MINI can be constructed similar to the topology described above and shown in FIG. 5. Given a word sequence $W_1, \ldots, W_N$ that have been output from the second-pass LVCSR decoder for the relevant utterances, words are then assigned words to speakers, in which the start time-frames of each word can be given as $t_0, \ldots, t_N$. Again the Viterbi algorithm is used to perform this task, but unlike the blind diarization process described above, here the computations are performed on a word basis; namely, given a word sequence $W_1, \ldots, W_N$, define M'[k,t] as the maximal score of reaching the k'th state after the first n words $W_1, \ldots, W_n$. Thus for each k, let: M'[k,0]=0 and for each $1 \leq n \leq N$, let:

$$M'[k, n] = \max_{1 \leq j \leq m'} \left\{ M'[j, n-1] + \pi(j, k) + \overline{\hat{S}_k(w_n)} \right\},$$

in which π(j,k) is the logarithmic weight of the transition from $S_j$ to $S_k$ and $\overline{\hat{S}_k(w_n)}$ is the averaged emission log-likelihood of the nth word from the GMM $\hat{S}_k$, defined as $$\overline{\hat{S}_k(w_n)} = \frac{1}{t_n - t_{n-1}} \cdot \sum_{\tau = t_{n-1}}^{t_n - 1} \hat{S}_k(\vec{x}_\tau).$$

Then locate the overall maximal score for the entire sequence, namely find $$\max_k M'[k, T]$$

and trace back the best path, which indices the segmentation, via back-pointers. This path determines the association of words to speakers.

Utilizing a second-pass blind diarization subsequent to a first-pass blind diarization can provide several advantages. For example, the results of a first-pass blind diarization are only used by the second-pass blind diarization to perform speaker adaptation of the acoustic features before sending them to the second-pass decoding. Even considering the drawbacks of the first-pass blind diarization process, these results are accurate enough for the feature-adaptation purpose. The second-pass filtering of non-speech segments is far more accurate that the first-pass filtering, which can lead to a more accurate determination of the correct number of speakers and, in many cases, to the creation of better speaker models.

Furthermore, word-level segmentation is more reliable, as classification is performed using broader support as opposed to a per-frame basis. Moreover, since the transition weight π(j,k) should not be tiny for j≠k, the second-pass blind diarization now makes it possible to detect short utterances of one speaker that are interleaved between the speech segments of another speaker.

FIG. 8 is a flow chart that depicts an exemplary embodiment of a method 800 of creating acoustic signatures for a speaker from multiple recorded audio sessions that can be based only on statistical models of the speakers in each of a set of recorded sessions. The method 800 can be carried out in isolation or in embodiments where diarization with an arbitrary number of speakers is being performed. For example, the method 800 may be carried out in building the acoustic voiceprint model at 218 of the method 200 as found in FIG. 2.

The method 800 includes a classification procedure 802 and an acoustic signature generation procedure 804. The classification procedure 802 seeks to identify which speaker models correspond to the common speaker and which models correspond to other speakers. Given a training set containing K sessions, each comprising several speaker models, speaker models of the nth session can be denoted by $S_1^{(n)}, \ldots, S_{K_n}^{(n)}$. Each model can be characterized by its occupancy, which is proportional to the number of feature vectors used to construct the model; the model occupancies of the nth session can be denoted by $\gamma_1^{(n)}, \ldots, \gamma_{K_n}^{(n)}$.

In some embodiments, the classification procedure 802 is performed by constructing an undirected similarity graph $\mathcal{G}$ having vertices correspond to the speaker models of all n sessions. In graph $\mathcal{G}$, two vertices $S_i^{(m)}$ and $S_j^{(n)}$ are said to be connected by an edge if the following holds $$j = \underset{1 \leq k \leq K_n}{\operatorname{argmin}}\, \delta(S_i^{(m)}, S_k^{(n)}) \wedge i = \underset{1 \leq k \leq K_m}{\operatorname{argmin}}\, \delta(S_k^{(m)}, S_j^{(n)}).$$

Note that the maximal possible degree of a vertex in $\mathcal{G}$ is (n−1). The distance $\delta(S_1, S_2)$ between a pair of GMMs $S_1$ and $S_2$ of dimension d, may be defined as follows: If both GMMs are defined over a common set of Gaussians, and differ only by their mixtures probabilities, we have $$\delta(S_1, S_2) = \sum_{i=1}^{m} (p_i^{(1)} - p_i^{(2)})^2,$$

if the GMMs do not share a common set of Gaussians, define:

$$\delta(S_1, S_2) = [(\ln p_1^{(1)} + S_2(\vec{\mu}_1^{(1)})) \oplus \ldots \oplus (\ln p_{m_1}^{(1)} + S_2(\vec{\mu}_{m_1}^{(1)}))] + + [(\ln p_1^{(2)} + S_1(\vec{\mu}_1^{(2)})) \oplus \ldots \oplus (\ln p_{m_{21}}^{(2)} + S_1(\vec{\mu}_{m_{21}}^{(2)}))]$$

The speaker models can then be classified according to the degree of their corresponding vertex in $\mathcal{G}$. Given two thresholds $0 < \tau_{min} < \tau_{max} < 1$, $S_i^{(m)}$ is classified as a common speaker model if $S_i^{(m)} > \tau_{max} \cdot (n-1)$, $S_i^{(m)}$ is classified as a general speaker model if $S_i^{(m)} < \tau_{min} \cdot (n-1)$, otherwise $S_i^{(m)}$ is unclassified.

In regards to the acoustic signature generation procedure 804, given a set of L GMMs, denoted $S_1, \ldots, S_L$, and their occupancies, denoted $\gamma_1, \ldots, \gamma_L$, a super-GMM is then constructed that captures the entire set of L GMMs. If all GMMs are defined over a common set of m Gaussians, the resulting super-GMM will also be defined over these common Gaussians, and its mixture probabilities $\hat{p}_1, \ldots, \hat{p}_m$ are given by:

$$\hat{p}_i = \sum_{j=1}^{L} \frac{\gamma_j}{\sum_{k=1}^{L} \gamma_k} \cdot p_i^{(j)}$$

However, if the set of Gaussians is not shared, a large set of N random feature vectors are generated. Since a GMM S represents a d-dimensional distribution, it is possible to generate a set of J random vectors $\vec{z}_1, \ldots, \vec{z}_N$ that are distributed according to this distribution in the following manner:

For each $1 \leq j \leq J$:
Pick up a mixture index $1 \leq i \leq m$, such the probability of picking a mixture is proportional to its probability $p_i$.
Generate a vector $\vec{y}_j$ of d independent random variables with standard normal distribution, namely $\vec{y}_{j,k} \sim \text{Normal}(0,1)$ for $1 \leq k \leq d$.
Using the mean vector $\vec{\mu}_i$ and the covariance matrix $\Sigma_i$ of the selected Gaussian, compute:

$$\vec{z}_j = \Sigma_i^{-1} \cdot (\vec{y}_j + \vec{\mu}_i).$$

Accordingly, if the set of Gaussians is not shared, a large set of N random vectors are generated using the procedure described above by computing $J_1, \ldots, J_L$ such that:

$$J_i = \left\lfloor \frac{\gamma_i}{\sum_{k=1}^{L} \gamma_k} \cdot N + \frac{1}{2} \right\rfloor$$

In particular, for each $1 \leq i \leq L$, generate $J_i$ random vectors from the GMM $S_i$.

A super GMM is then created by training a Gaussian mixture model over these random feature vectors. The number of mixtures in this super-GMM may be given by a parameter k, in which case the model can be trained by iterative Gaussian splitting or by clustering the random data vectors using the k-means algorithm. Alternatively, the resulting number of mixtures can be determined by the data if we use bottom-up clustering or mean-shift clustering.

In other words, executing the classification procedure 802 obtains two sets of GMMs. In particular, a set of common speaker GMMs, which can be denoted $\mathcal{S}_C$, and a set of generic speaker GMMs, which can be denoted $\mathcal{S}_G$. Then two super-GMMs are constructed, $A_C$ from $\mathcal{S}_C$ and $A_G$ from $\mathcal{S}_G$ 804, the acoustic signature for the common speaker is given as the super-model pair $\langle A_C, A_G \rangle$.

Note that given a session that is not included in the training set, it is possible to collect the set $\mathcal{X}$ of all feature vectors from segments that are judged to belong to the same speaker. In such a case, given an acoustic signature $\langle A_C, A_G \rangle$, the likelihood that this speaker corresponds to this signature can be expressed as:

$$\frac{1}{|x|} \cdot \sum_{\vec{x} \in X} A_C(\vec{x}) - A_G(\vec{x})$$

Method 800 provide several advantages over known acoustic signature creation processes. For example, method 800 allows one to generate an acoustic signature without the need for processing an entire audio data or extracting acoustic features from an entire audio data. Method 800 only needs to accumulate the speaker models of the training sessions. Speaker models are far more compact and consume less memory or disk space as compared to audio data. Additionally, it is possible with method 800 to generate an acoustic signature even if the common speaker is not present in all sessions of the training set, provided that other speakers do not occur frequently in the training sessions.

The functional block diagrams, operational sequences, and flow diagrams provided in the figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of creating an acoustic signature for a speaker from multiple audio sessions and for performing diarization, the method comprising:
receiving, from an audio data source, audio data at an audio communications interface of a computing system, the audio data defining a training set containing a number of recorded audio sessions, wherein the computing system is configured to construct, from each audio session, a plurality of respective speaker models, wherein each speaker model is characterized by aggregating acoustic features into respective feature vectors that define a respective occupancy which is proportional to a total number of feature vectors used to construct the speaker model, and wherein the speaker models are Gaussian mixture models (GMMs) defined over a common set of Gaussian distributions that differ only by respective mixture probabilities for the acoustic features present in the feature vectors;

classifying the plurality of speaker models to identify a set of common speaker GMMs and a set of generic speaker GMMs, wherein the classifying includes constructing an undirected similarity graph having vertices corresponding to the plurality of respective speaker models of all the recorded audio sessions in the training set and classifying the plurality of speaker models according to a degree of similarity between the corresponding vertices in the undirected similarity graph in relation to at least one threshold degree of similarity;

generating an acoustic signature by at least:
constructing a super-GMM for the set of common speaker GMMs, and
constructing a second super-GMM for the set of generic speaker GMMs by generating a set of random vectors and training a second GMM over these random vectors, wherein a respective acoustic signature for a common speaker is given as a super-model pair of the two constructed super-GMMs;

storing the two constructed super-GMMs in a computing system memory;

receiving additional audio data at the audio communications interface;

identifying the common speaker using the super-model pair; and labeling the additional audio data with an identified common speaker label.

2. A The method according to claim 1, wherein the audio data comprises one of a .WAV format, a PCM format, and a LPCM format.

3. The method according to claim 1, further comprising, decoding at least one segment of the audio data, transcribing the segment of audio data, producing a diarized transcript, and using a voice activity detector to classify the audio data into speech and non-speech segments by assessing a dynamic energy range for each segment of audio data.

4. The method according to claim 1, wherein the audio data originates from a recording stored on a server.

5. The method according to claim 1, wherein the audio data is a real time stream of audio data.

6. The method according to claim 1, further comprising displaying the undirected graph on a graphical display connected to the computing system.

7. The method of for creating a plurality of acoustic signatures and for performing diarization, comprising:
receiving audio data at a communication interface of a computing system on a frame by frame basis,
creating a speech to text transcription of the audio data;
clustering respective segments of the audio data according to word sequences;
classifying the segments to identify a set of common speaker Gaussian mixture models (GMMs) and a set of generic speaker GMMs, wherein the classifying includes constructing an undirected similarity graph having vertices corresponding to a plurality of speaker models of previously recorded audio sessions in a training set;
wherein the classifying further includes determining with a processor in the computing system a degree of similarity between the corresponding vertices in the undirected similarity graph in relation to at least one threshold degree of similarity;

generating an acoustic signature by at least:
constructing a super-GMM for the set of common speaker GMMs, and
constructing a second super-GMM for the set of generic speaker GMMs by generating a set of random vectors and training a GMM over these random vectors, wherein the acoustic signature for respective common speakers is given as a super-model pair of the two constructed super-GMMs; and storing the two constructed super-GMMs in a computing system memory;

receiving additional audio data at the communication interface;

identifying a respective common speaker using the super-model pair; and labeling the additional audio data with an identified common speaker label.

8. The method according to claim 7, further comprising utilizing a diagonal Gaussian distribution for the clusters to calculate the log likelihood.

9. The method according to claim 7, wherein the prerecorded training sets reside on a server.

10. The method according to claim 7, further comprising filtering short utterances as background audio.

11. The method according to claim 7, further comprising filtering out short utterances on a time duration basis.

12. The method according to claim 7, further comprising classifying the clusters according to Mel-frequency cepstral coefficients (MFCC) for each frame.

13. The method according to claim 7, further comprising:
determining a cluster of segments to be comprised of respective utterances and representing a distribution of feature vectors in the respective utterances;
characterizing each feature vector in terms of its probability of being present in one of the clusters;
calculating a distance metric between utterances according to the probability;
identifying time between speakers in the audio stream.

14. The method according to claim 13, further comprising:
using distances between utterances to construct an affinity matrix based upon respective distances;
computing a stochastic matrix from the affinity matrix;
computing eigenvalues and corresponding eigenvectors of the stochastic matrix; and
computing an embedding of the utterances into dimensional vectors;
identifying embedded utterances in a frame as an additional speaker or as additional background audio.

15. The method according to claim 7, further comprising using the processor to determine the degree of similarity by calculating a distance ($\delta$) between the corresponding vertices of the speaker models.

16. The method according to claim 7, further comprising displaying the undirected graph on a graphical display connected to the computing system.

* * * * *